(12) United States Patent
Hansom et al.

(10) Patent No.: US 9,746,117 B2
(45) Date of Patent: Aug. 29, 2017

(54) METHOD OF INSTALLING FUEL LINES IN AN AIRCRAFT

(71) Applicant: The Boeing Company, Chicago, IL (US)

(72) Inventors: Christopher Michael Hansom, Seattle, WA (US); James P. Irwin, Renton, WA (US); Nathan Michael Kelley, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/992,494

(22) Filed: Jan. 11, 2016

(65) Prior Publication Data

US 2016/0123512 A1    May 5, 2016

Related U.S. Application Data

(62) Division of application No. 13/327,850, filed on Dec. 16, 2011, now Pat. No. 9,233,758.

(51) Int. Cl.
*F16L 39/00* (2006.01)
*B64D 37/32* (2006.01)
(Continued)

(52) U.S. Cl.
CPC ............ *F16L 39/005* (2013.01); *B64D 37/32* (2013.01); *B64D 45/02* (2013.01);
(Continued)

(58) Field of Classification Search
CPC ..... F16L 13/0245; F16L 13/103; F16L 25/01; F16L 25/025; F16L 13/10; F16L 21/00; F16L 21/02; F16L 55/00; F16L 47/24; B64D 45/02; B64D 37/32; Y02T 50/44; Y10T 137/0402; Y10T 29/49428; Y10T 29/4943; Y10T 29/49446; Y10T 29/49982
See application file for complete search history.

(56) References Cited

U.S. PATENT DOCUMENTS 3,891,290 A * 6/1975 Marshall ............. F16L 19/0218
174/78
4,249,786 A * 2/1981 Mahoff .................... F16L 23/04
174/94 S (Continued)

*Primary Examiner* — Sarang Afzali
(74) *Attorney, Agent, or Firm* — Miller, Matthias & Hull LLP

(57) ABSTRACT

A fuel line assembly for an aircraft comprises a ferrule assembly comprising a ferrule affixed to an isolation tube, which may be directly affixed to a fuel tube or affixed to an extension tube, which in turn, is affixed to the fuel tube. The ferrule assembly provides electrostatic discharge protection and lightning protection as the isolation tube maintains a separation distance from the ferrule and fuel tube, both of which are made from metal. The isolation tube is made from a dielectric material, but which may have conductive particles added to aid in the dissipation of an electrostatic charge. The electrical resistance through the isolation tube has a lower limit to arrest the flow of the induced lightning current through the assembly. The amount of lightning protection afforded can be configured. The ferrule assembly components may be affixed by using thermo-welding, adhesive, or mechanical pressure.

7 Claims, 11 Drawing Sheets

(51) Int. Cl.
    *F16L 13/02* (2006.01)
    *F16L 13/10* (2006.01)
    *F16L 25/01* (2006.01)
    *F16L 25/02* (2006.01)
    *F16L 25/03* (2006.01)
    *F16L 47/03* (2006.01)
    *F16L 47/24* (2006.01)
    *B64D 45/02* (2006.01)

(52) U.S. Cl.
    CPC ......... *F16L 13/0245* (2013.01); *F16L 13/103* (2013.01); *F16L 25/01* (2013.01); *F16L 25/025* (2013.01); *F16L 25/03* (2013.01); *F16L 47/03* (2013.01); *F16L 47/24* (2013.01); *Y02T 50/44* (2013.01); *Y10T 137/0402* (2015.04)

(56) References Cited

U.S. PATENT DOCUMENTS

| | | | |
|---|---|---|---|
| 6,880,859 B2* | 4/2005 | Breay | F16L 21/06 285/1 |
| 6,971,682 B2* | 12/2005 | Hoang | F16L 39/005 285/123.12 |
| 8,360,477 B2* | 1/2013 | Flynn | F16L 25/01 285/145.1 |
| 2010/0001512 A1* | 1/2010 | Breay | B64D 37/32 285/50 |

* cited by examiner

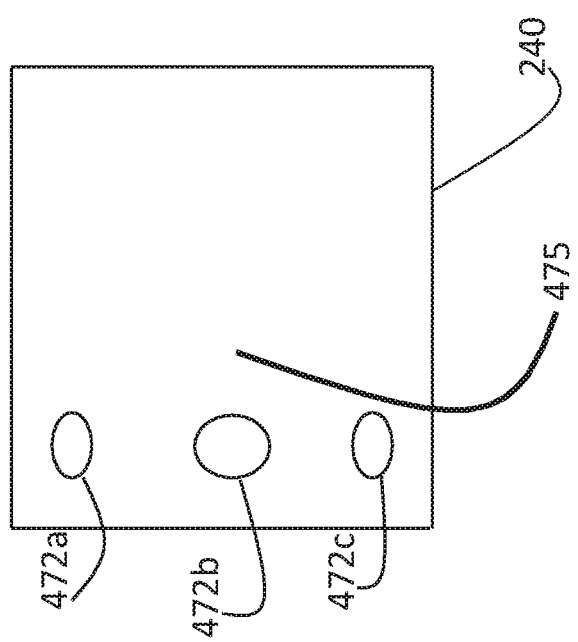

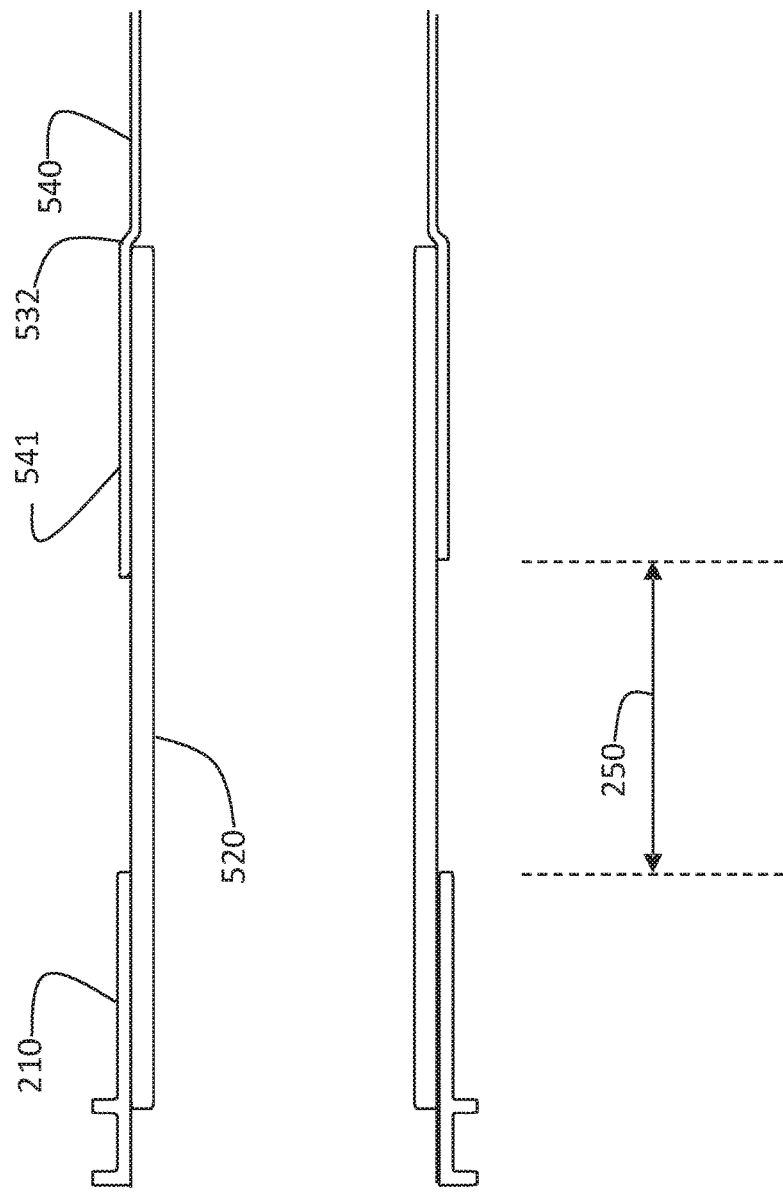

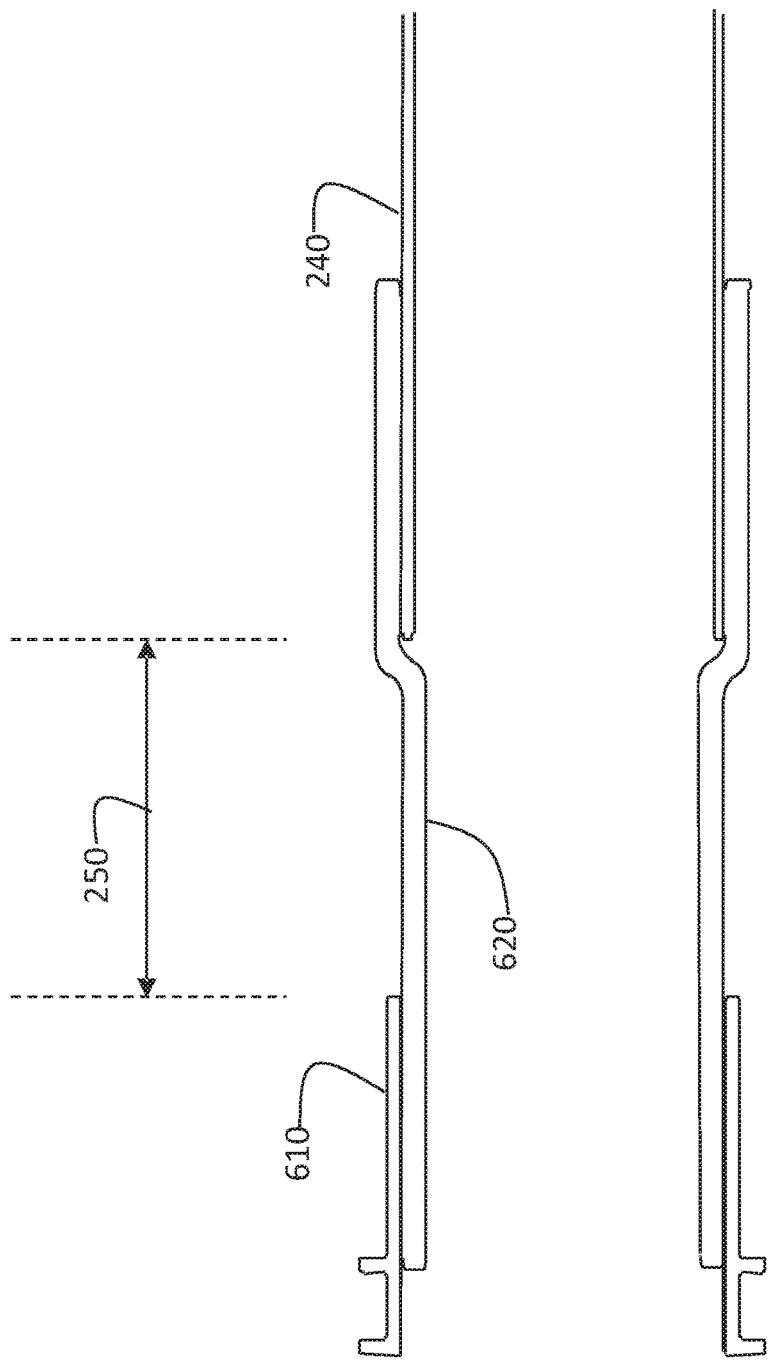

METHOD OF INSTALLING FUEL LINES IN AN AIRCRAFT

CROSS-REFERENCE TO RELATED APPLICATIONS

This application is a divisional patent application of co-pending U.S. patent application Ser. No. 13/327,850, filed on Dec. 16, 2011, entitled "Electrostatic Discharge Protected Ferrule," now U.S. Pat. No. 9,233,758, the entire disclosure of which is expressly incorporated by reference in its entirety.

FIELD OF THE DISCLOSURE

The disclosure generally pertains to protecting tubular components, such as fuel tubes coupled with other components inside the fuel tanks of a composite aircraft, from lightning and electrostatic discharge.

BACKGROUND

Aircraft are frequently designed so that the fuel tanks are incorporated into the wing structures. This necessitates installation of tubular components for conveying fuel from the fuel tank to various locations that are internal or external to the fuel tank. Frequently, the tubular components must interconnect with other tubular components or system components, such as fuel pumps. This requires a system for protecting the fuel tubes from electrical discharges in the tube interconnections that could result from electrical currents generated flowing through the tubing by electrostatic charging, lightning, faults, or shorts in the aircraft electrical system. Fuel inside a fuel tank is combustible and therefor it is necessary for the fuel tube connectors to be protected from ignition sources that could result from such electrical discharges.

Inside the fuel tanks of traditional aluminum aircraft, the transient voltages and currents coupled by lightning to tubing inside aluminum fuel tanks are small, without enough energy to ignite fuel vapor in the event of a spark. However with the transitioning of aircraft structural components from metal to non-metal composites, the threat of electromagnetic effects ("EME") failures in composite wing fuel tanks are typically more severe than in metal wing fuel tanks due to the non-homogeneous nature of composite materials and/or the lower intrinsic conductivity of composite structures, both of which may result in (1) a higher lightning induced voltage applied to the systems through the connections of the systems to the composite structure, and (2) a higher lightning induced current generated by these voltages in internal systems, which if high enough, can produce sparking in the interconnections involving the systems with enough energy to ignite fuel vapor inside a fuel tank.

Any system for installing tubular components in an aircraft should also minimize weight. It is desirable that any system involve as few as possible parts to facilitate installation and maintenance. Therefore, systems and methods are needed to easily, inexpensively, and effectively provide for the installation and electrical isolation of fuel system components.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

The disclosure is generally directed to providing connection components that provide lightning and electrostatic protection as needed for fuel lines installed in an aircraft and that also provides an easy, inexpensive, and effective method for installation, whereas, to save weight, the amount of lighting protection in terms of minimum length and minimum resistance can be adjusted to the level of the particular induced voltage applied from tube-to-tube across the isolator In one embodiment, a method for installing fuel lines in an aircraft includes the operations of affixing an isolation tube to a first fuel tube, affixing a ferrule to the isolation tube, installing the first fuel tube section in a structure of the aircraft, and affixing the ferrule to a fuel system component, wherein any of the first three operations can be performed in any order.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 4B illustrates a side view of the fuel tube according to one embodiment disclosed herein, FIGS. 5A-5B illustrate a cross-sectional view of a fuel tube connector assembly according to various embodiments disclosed herein, FIG. 6 illustrates another cross-sectional view of a fuel tube connector assembly according to various embodiments disclosed herein.

DETAILED DESCRIPTION

Figure 1:
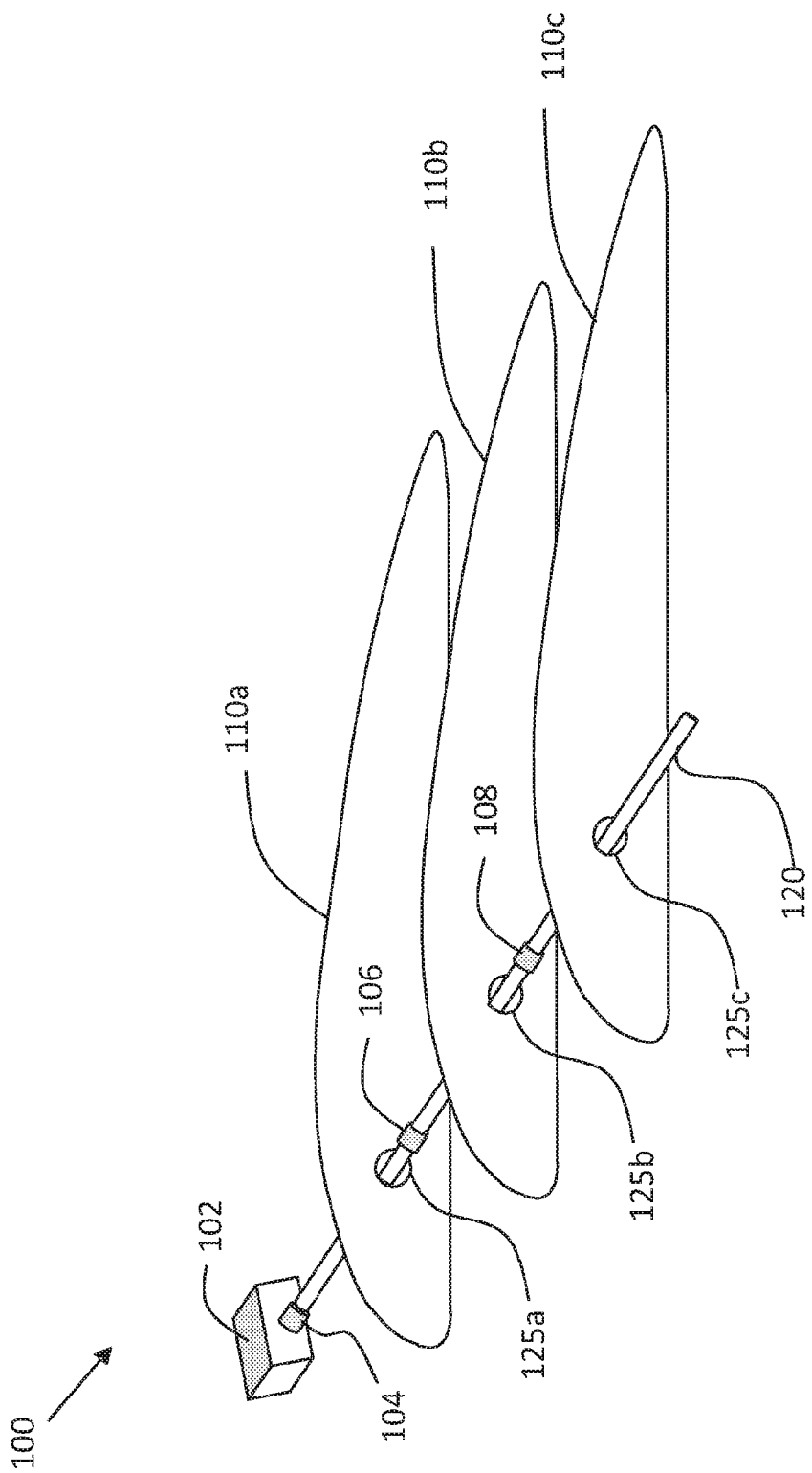
FIG. 1 illustrates the various embodiments of connecting a fuel tube inside the wing of an aircraft according to various embodiments disclosed herein.

The following detailed description is generally directed to a fuel tube connector system for connecting tubular components, such as used in the installation of a fuel tube in the wing of an aircraft, which protect against electrical discharges from electrostatic and lightning induced transients. Although described in the context of an aircraft, the concepts and technology presented herein could apply to other structures or applications, including industrial plants, ships, submarines, or other types of vehicles.

Aircraft frequently incorporate fuel tanks that are designed in the wing structures, so that the wing ribs may be part of the fuel tanks. Fuel lines, in the form of fuel tubes, are required to convey fuel from one tank to another or to the engine. The fuel lines frequently pass through bulkheads or the wing ribs and may be further connected to various fuel system components, such as pumps and valves, as well as the engine components. The fuel lines are frequently installed in sections, since this facilitates installation, repair, and inspection.

The fuel system must be protected from potential ignition of fuel vapor or fuel at every point in the fuel system. Federal regulations require "that an ignition source could not result from each single failure, from each single failure in combination with each latent failure condition not shown to be extremely remote, and from all combinations of failures not shown to be extremely improbable. The effects of manufacturing variability, aging, wear, corrosion, and likely damage must be considered." (CFR 25.981(a)(3)). Thus, any system for connecting sections of the fuel tube with various components should provide proper electrostatic and lightning protection.

A technique to prevent fuel vapor ignition from a possible spark at an interconnection of tubing is to arrest the flow of current through the tubing to prevent the occurrence of the spark or limit the energy in the spark to a safe level. In this technique, the electric current is prevented from flowing through the tubing by inserting isolating elements in-line into the tubing with enough isolation to stand-off the lightning voltage applied to the tubing through the connections of the tubing to the composite structure of the airplane. Modules comprised of tubular isolating elements with couplings on both sides of the elements for connection into a system of tubing can be inserted in the tubing inside a fuel tank to provide electrical isolation. These modules with couplings may be heavy and may provide more electrical isolation than is needed for the application.

In one embodiment disclosed herein for saving weight, a tubular isolating element is permanently attached to fuel tube on one end and a coupling on the other end for interconnection into a system of tube. Then a minimum length and a minimum electrical resistance through the isolating element are adjusted to provide the necessary isolation to stand off an anticipated lightning voltage and prevent flashover over the isolating element or breakdown through the element. Additionally, a maximum electrical resistance is specified to enable sufficient electrostatic grounding through the isolator.

The minimum isolating length for a particular isolating element can be specified by a particular lightning voltage the isolator must withstand from tube-to-tube without flashover in vacuum for an airplane flying at a particular altitude. An altitude can be 40,000 ft. for lightning. In this case, a length for a particular element can range from 0.5 inch to withstand 1000V tube-to-tube to 3 inches to withstand 5000V tube-to-tube. A minimum limit can be 0.2 inch @ 400V.

The minimum resistance for a particular isolating element can be specified by a particular lightning voltage the isolator must withstand from tube-to-tube without voltage breakdown and undesirable conduction of lightning induced current through the isolating material. In this case a resistance for a particular element can range from 20 KΩ to withstand 1000V tube-to-tube @ 0.5 inch separation distance from tube to ferrule to 100 KΩ ohms to withstand 5000V tube-to-tube @ 3 inches separation. Different resistances to withstand different voltages can be determined by extrapolating the above. A least limit can be 8 KΩ to withstand 400V @ 0.2 inch separation.

The maximum electrical resistance for a particular isolating element can be 100 MΩ tube-to-tube for all lengths of elements. However in cases of very short lengths of isolating element, less than or equal to 0.5 inch, the maximum electrical resistance can be omitted. In this case the isolating element cannot not be relied upon to provide an electrostatic ground path through the interconnected tubing.

One context for applying the concepts herein is shown in FIG. 1. In FIG. 1, a fuel tube 120 passes through a wing structure comprising a collection of ribs 110a-110c. The ribs 110a-110c (collectively referred to as 110) generally are similar in profile and are spaced apart. The outer wing structure and outboard tank closeout rib are not shown for clarity. The fuel tube 120 generally passes perpendicular to the ribs, along the length of the wing structure; although in other instances it may pass at an angle to the ribs. A series of apertures 125a-125c (collectively referred to as 125) in the ribs are provided to accommodate the fuel tube. The "pass-thru" point is where the fuel tube 120 passes through the aperture 125 in a structure. The apertures 125 must be large enough to allow the fuel tube to be canted at an angle and maneuvered about when installed.

The fuel tube may be made up of sections that are connected together using fuel tube connector assemblies 104, 106, and 108. The connector assemblies 104, 108 may be used to connect two sections of fuel tube together, or a connector assembly 104 may be used to connect a fuel tube to a pump 102, valve, or other non-fuel tube component.

The ribs 110 may be either internal or external to the fuel tank. In some embodiments, the fuel tank may be configured within the wing so that the fuel tank incorporates the ribs. In other embodiments, fuel tanks may be located between adjacent ribs and connected by one or more fuel tubes.

The fuel tube must be protected not only from electrical discharges caused by lightning induced voltages between the fuel tube 120 and structure (e.g. ribs) 110, but also from electrical discharges caused by the lightning induced current in the connector assemblies at the interconnections between the individual sections of fuel tube 106, 108. The isolators disclosed herein are used to block the lightning induced current in the sections of fuel tube to prevent electrical discharges in the connector interconnections. However, when isolators are used in this fashion, the isolating element in the isolator must be designed to prevent electrical discharges from the lightning voltages induced tube-to-tube across the isolators The connector assemblies 104, 106, and 108 shown in FIG. 1 are illustrative of how the connector components are used. The connector assembly comprises in one embodiment, a male component affixed to the fuel tube, and a female component affixed to a coupler, valve assembly, pump assembly, etc. In another embodiment, the connector assembly comprises a male component affixed to a fuel tube on each side of the connector. The concepts disclosed henceforth focus on the male component, which is referred to herein as a ferrule assembly. The ferrule assembly may be attached to the fuel tube, forming a fuel tube connection assembly.

Although the principles and concepts herein are described with the ferrule assembly affixed to a fuel tube, the principles and concepts may apply to other applications. For example, the tube could convey various forms of other liquids, and the ferrule assembly could be affixed to other components, as opposed to tubing. Thus, it is possible that the ferrule assembly could be used to connect two fuel system components directly together, where one incorporates the ferrule assembly, and the other incorporates the female receptacle. This could be used, for example, to interconnect a pump and valve assembly in a module manner, but yet without using a tube. Those skilled in the art will no doubt be able to use the teachings of the disclosure herein to apply the principles and concepts to other applications.

Figure 2A:
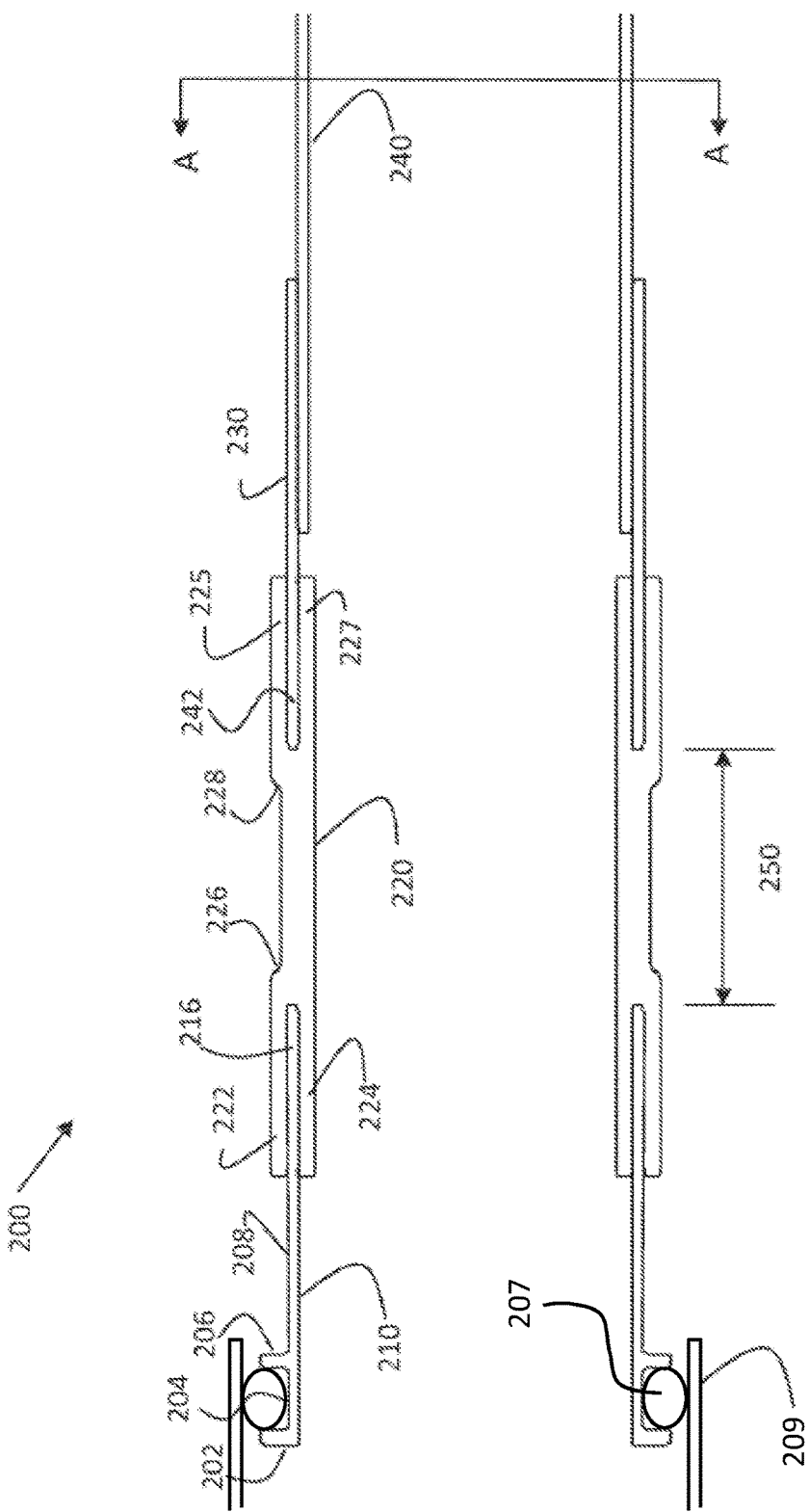
FIGS. 2A-2C illustrate a cross-sectional view of a fuel tube connector assembly according to various embodiments disclosed herein.
Figure 2B:
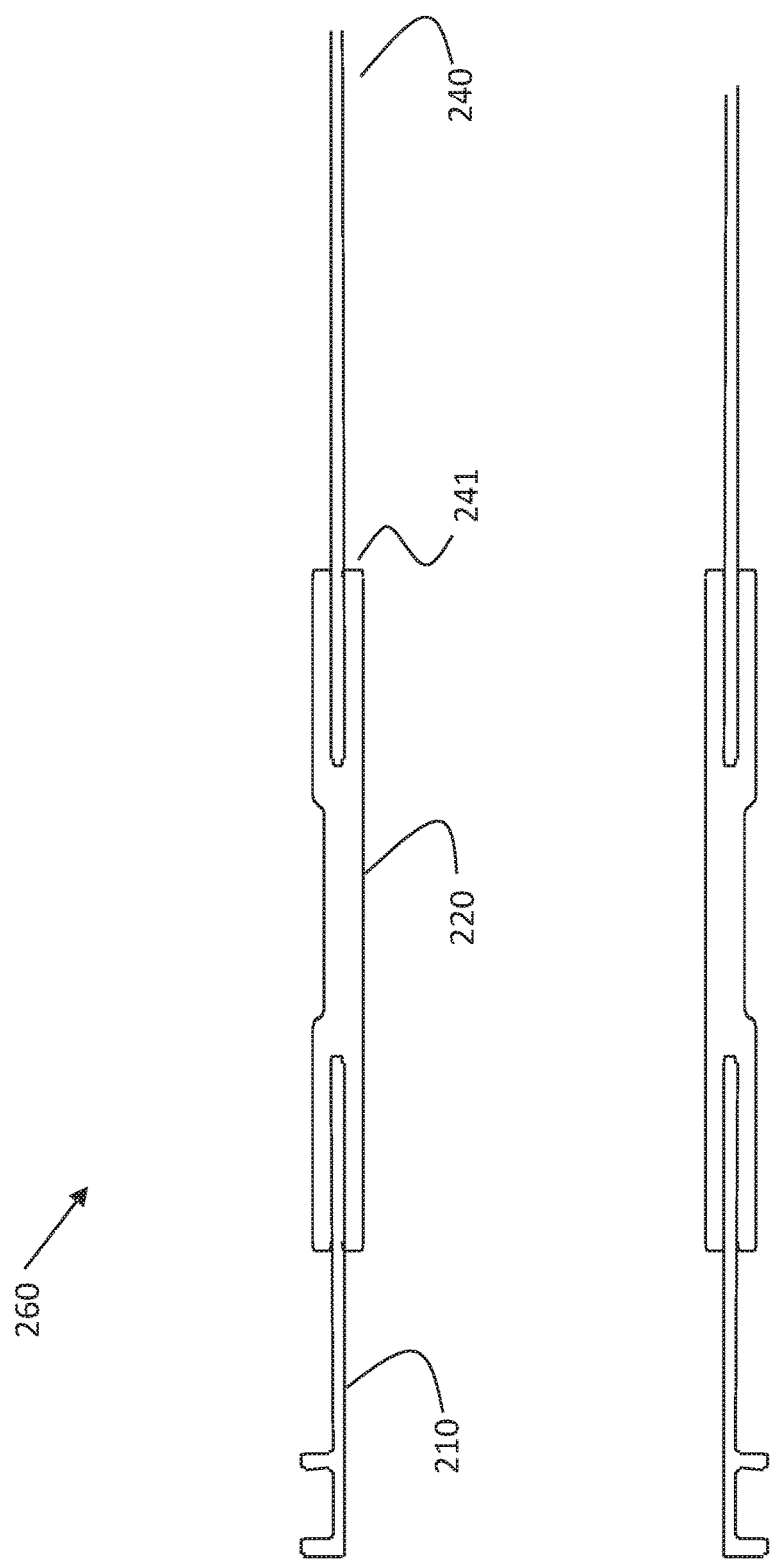
Figure 2C:
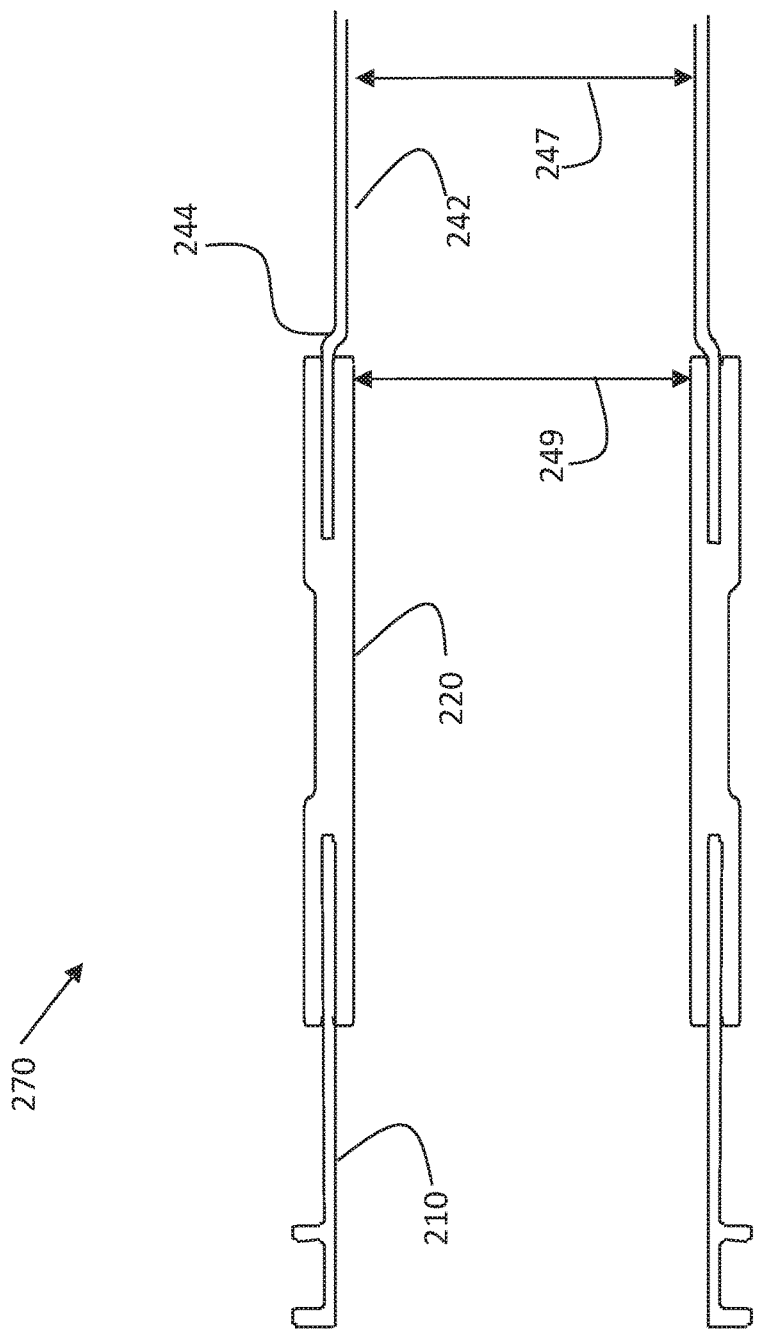

Turning to FIGS. 2A-2C, FIG. 2A illustrates a cross-sectional view of one embodiment of an EME ferrule assembly 200. The ferrule assembly 200 comprises, in this embodiment, three main components: a ferrule 210, an isolation tube (also referred to herein as an "isolator") 220, and an extension tube (also referred to herein as "extension") 230. These three components are affixed to the fuel tube 240. Since FIG. 2A is a cross-sectional view of the components, the top portion depicted in FIG. 2A is a mirror image of the bottom portion. For reference purposes, the left side of a component in FIG. 2A (and the other figures) will be referred to as the "front" side, and the right side of the component in FIG. 2A will be referred to as the "back" side. No restriction should be implied as to the direction of the flow by use of these terms, and no restriction should be implied as to orienting the components in the reverse manner (e.g., the front side could be repositioned on the right side in other views).

The ferrule 210 comprises a front lip 202 and a back lip 206 which form a channel 204 for containing an O-ring 207. The O-ring 207 serves to ensure no fuel leakage occurs by sealing the ferrule 210 with the inside of a coupler 209. The ferrule comprises a main body portion 208, a portion of which 216 is inserted into a deep groove within the isolation tube 220. In one embodiment, the ferrule is made of metal, such as aluminum, or an aluminum alloy. Other metals, such as titanium could be used. In still other embodiments, the ferrule may be made of plastic.

The isolation tube 220 serves to stand off the lightning induced voltage and eliminate the possibility of an electrical discharge between the ferrule 210 and the fuel line 240. In some embodiments, for short isolation tubes (e.g. ≤0.5 inch) the isolation tube can be made in one embodiment from PEEK (a.k.a. polyetheretherketone) or PEKK (polyetherketoneketone), which is normally non-conductive or other suitable dielectric material. In other embodiments for short and for long isolation tubes (e.g. >0.5 inch), a conductive additive can be added to the non-conductive material to provide enhanced electrical conductivity to control the electrical resistance from the ferrule to the extension tube through the isolation tube to fall within a permissible range. This can be accomplished by adding ground metal particles, carbon black or other suitable conductive matter to the material forming the isolation tube. The enhanced electrical conductivity can enable the relaxing of any electrostatic charge that may be developed in the isolation tube and an electrostatic ground path through the isolation tube between the individual sections of tube interconnected by the ferrule assembly.

The minimum resistance for a particular isolating element can be specified by a particular lightning voltage the isolator must withstand from tube-to-tube without voltage breakdown and undesirable conduction of lightning induced current through the isolating material. In this case a resistance for a particular element can range from 20 KΩ to withstand 1000V tube-to-tube @ 0.5 inch separation distance from extension tube-to-ferrule to 100 KΩ ohms to withstand 5000V tube-to-tube @ 3 inches separation. Different resistances to withstand different voltages can be determined by extrapolating the above. A minimum limit can be 8 KΩ to withstand 400V @ 0.2 inch separation.

The maximum electrical resistance for a particular isolating element can be 100 MΩ tube-to-tube for all lengths of elements. However, in cases of very short lengths of isolating element, less than or equal to 0.5 inch, the maximum electrical resistance cam be omitted. In this case the isolating element cannot be relied upon to provide an electrostatic ground path through the interconnected tubing.

In other embodiments, the isolation tube can be made from proportionate amounts of carbon, glass, or Kevlar™ reinforced fibers, with or without the conductive additives in a resin, thermoplastic or any other binding material. Thus choice of material used for the isolation tube 220 may impact how the isolation tube and the ferrule are affixed.

The isolation tube 220 has an outer, front band 222 and an inner, front band 224 which form a groove to receive the ferrule 210. The isolation tube may have a corresponding outer band 225 and inner band 227 on the back side (i.e., the right side of FIG. 2). In some embodiments, the isolation tube may be symmetric from front to back, so that it is not critical as to which groove receives the ferrule 210.

The groove formed by the back outer band 225 and back inner band 227 receives an extension tube 230, which can also be made from metal, such as aluminum, or other metals. In other embodiments, the extension tube can be made from plastic, carbon fiber, or other materials. In one embodiment, as shown in FIG. 2, the extension tube 230 is a straight, cylindrically shaped tube. The extension tube 230 is fitted over the fuel tube 240, which can also made of aluminum, other metals, or plastic. If the extension tube and fuel tube are made from metal, they are typically made from the same metal so that there is no galvanic reaction between the extension tube and the fuel tube. Further, typically the ferrule 210 is made from the same material as it may contact other metal, e.g., a coupler, which typically also is made from the same metal.

The isolation tube 220 may comprise a center section that produces a separation distance 250 that is defined as the distance between the ferrule 210 and the extension tube 230 when both are inserted into the isolation tube 220. The separation distance provides electrical isolation between the metal ferrule 210 and the metal extension tube 230. The separation distance may be anywhere from 0.2 inches to 3.0 inches in various embodiments depending on the fuel tube size and the desired lightning voltage protection. For example, in one embodiment, at altitudes of 40 K feet, the separation distance in fuel tanks may be 3.0 inches to withstand 5000V from ferrule-to-extension tube. In other embodiments, the separation distance may be to 0.5 inch to withstand 1000V from ferrule-to-extension tube. The greater the separation distance, the greater protection that is provided from the lightning induced voltage between the ferrule 210 and the extension tube 230. A minimum limit can be 0.2 inch @ 400V. The exact value will depend on the lightning induced voltage that is expected between the ferrule 210 and the extension tube 230, the altitude at which the isolator is used, and the gas in which the isolator is used.

The separation distance can be increased further than required to provide an additional level of protection. However, if the distance is shorter than required, then the desired level of lightning protection may not be achieved.

Figure 3:
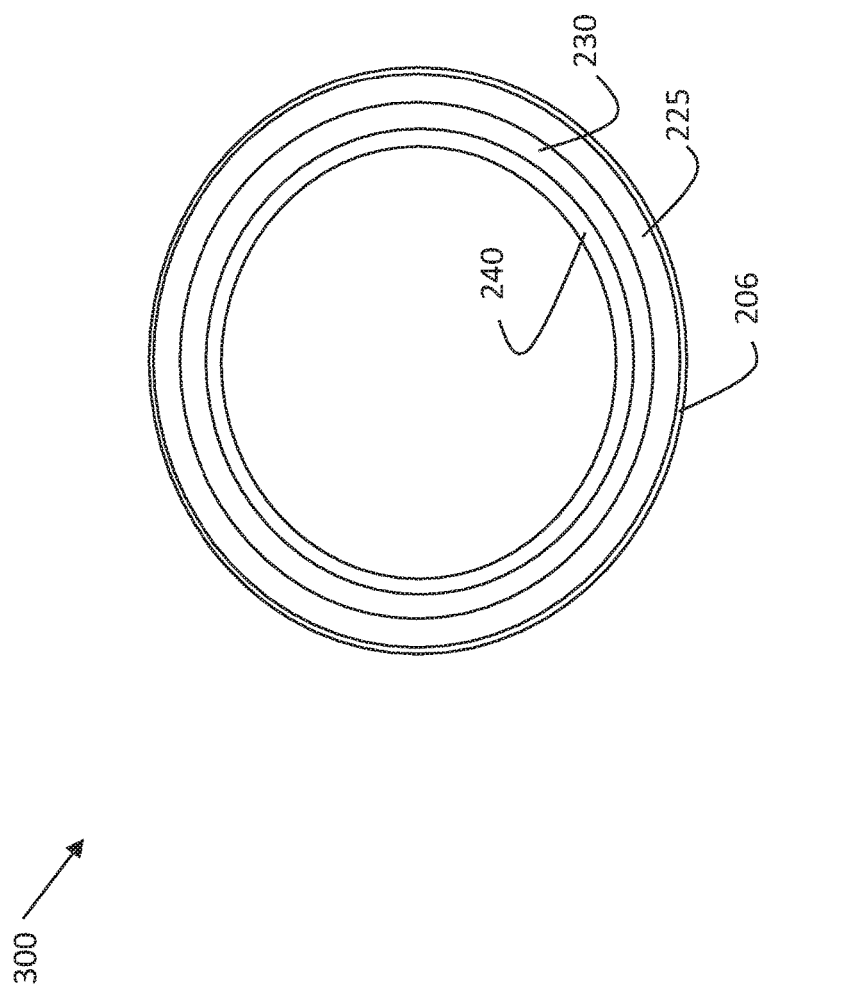
FIG. 3 illustrates an end view of the fuel tube connection assembly according to at least one embodiment disclosed herein.

An end view of the ferrule assembly 200 at point A-A is provided in FIG. 3. Turing to FIG. 3, the end view appears as a series of concentric circles, which comprises the fuel tube 240, which is encircled by the extension tube 230, which in turn is encircled by the outer band 225 of the isolation tube 220. Lastly, the back lip 206 is visible. In other embodiments, the back lip may not be visible.

FIG. 2B illustrates another embodiment of a ferrule assembly 260. In this embodiment, the ferrule 210 is inserted into a groove of the isolation tube 220. However, in this embodiment, the extension tube is not present. Rather, the isolation tube receives the fuel tube 240. This embodiment avoids using an additional component, but it may involve additional processing of the fuel tube to prepare the fuel tube to be connected to the isolation tube, as will be seen below. Further, in this embodiment, the shoulder 241 created by the isolation tube and the fuel tube forms an area which can disturb the fuel flow, and reduce the net diameter relative to the fuel tube.

To address this issue, another embodiment is shown in FIG. 2C. In this embodiment, the fuel tube 240 is processed to form a bell-end. In other words, this end of the fuel tube has a larger diameter compared to other portions of the fuel tube. The portion of the fuel tube 243 inside the groove of the isolation tube 220 is expanded in diameter beginning at deformation point 244. This allows the diameter 247 of the fuel tube and the diameter or the isolation tube 249 to be closer in value, if not the same, so that fuel flow is not constrained or disturbed at the junction of the isolation tube 220 and the fuel tube 240.

Figure 4A:
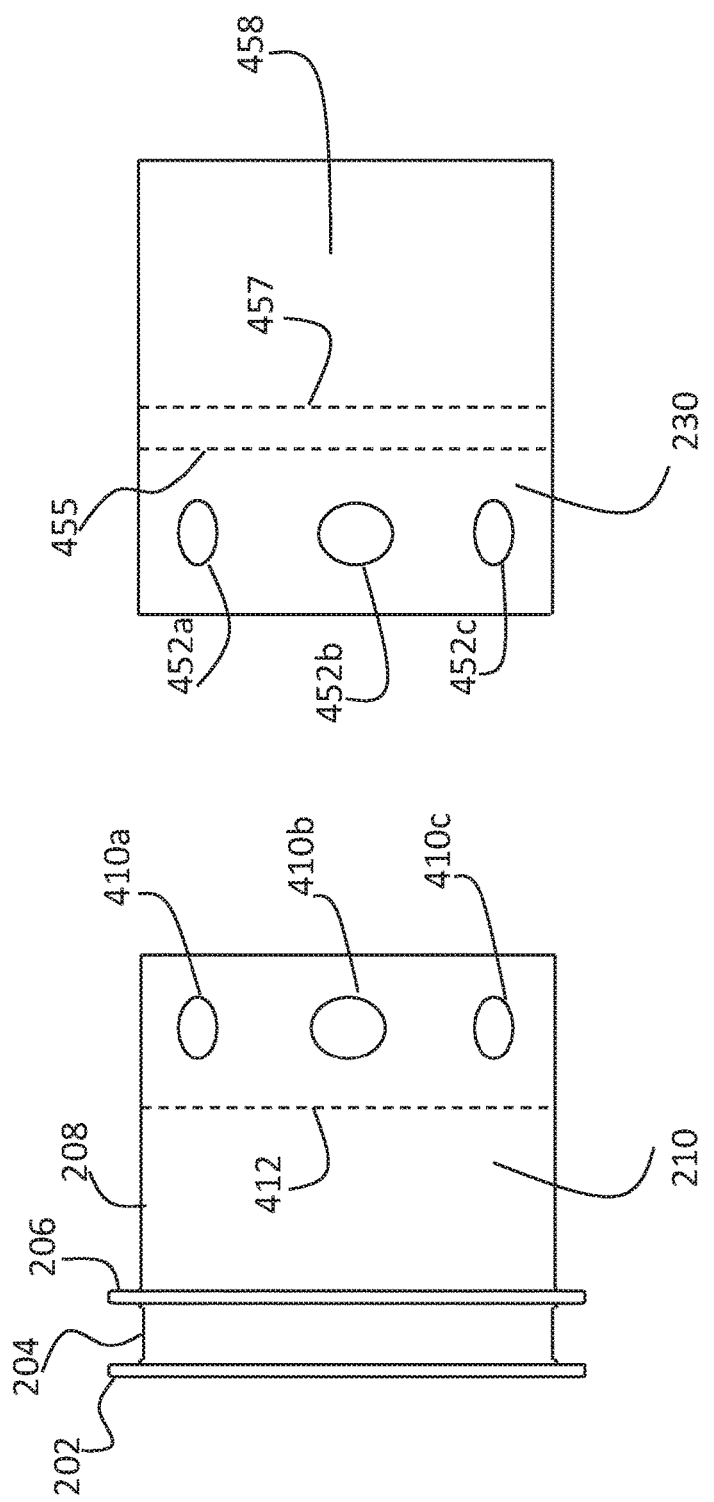
FIG. 4A illustrates a side view of two components of the fuel tube connector assembly according to one embodiment disclosed herein.

The ferrule 210 and extension tube 230 shown in FIG. 2A are also shown in FIG. 4A. FIG. 4A depicts a side view of these components and illustrates the structure that is otherwise hidden by the isolation tube 220. In FIG. 4A, the ferrule 210 is shown with the front lip 202, the channel 204, and the back lip 206. The main body 206 is shown without portions obstructed by the isolation tube 220. The dotted lined 412 depicts the point where the isolation tube would slip over the back portion of the main body. The back portion comprises a series of holes 410a, 410b, and 410c (collectively referred to as 410). The holes 410 are, in one embodiment, evenly spaced around the circumference of the ferrule. In one embodiment, there may be eight holes. Other embodiments may have greater or fewer, and may be in a different shape or configuration.

The extension tube 230 also has a series of holes 452a-452c (collectively referred to as 452) on the side wall 458. The front dotted line 455 identifies that portion of the extension tube that is within the isolation tube groove. The back dotted line 457 identifies where the fuel tube is inserted within the extension tube.

The holes 410, 452 are involved in joining the ferrule 210 and extension tube 230 to the isolation tube. In one embodiment, thermo-welding is used for affixing the components. Heat applied to the isolation tube will melt portions of the inner band and outer band in and around the holes 410, 452 of the ferrule 210 (and the extension tube 230 as well) to seal and mechanically affix the components together. In another embodiment, an adhesive set into the groove is used, and also enters in and around the holes 410, 452 after the components are joined together. Other mechanisms for affixing may be used, including rivets, screws, threaded screws about the ferrule and extension tube, or friction fit.

The extension tube 230 may be attached to the fuel tube (not shown in FIG. 4A) by mechanically compressing ("swaging") the extension tube 230 around the fuel tube 240. This results in a mechanical, friction fit bond. When swaging, the extension tube may include the same grooves on the inside diameter as already used in the industry for ferrules to provide a mechanical lock for securing the tubes after the swaging process. In other embodiments, sealants, adhesives, or other means can be used to affix the extension tube 230 with the fuel tube 240 or in conjunction with swaging.

Returning to FIGS. 2B and 2C, these illustrate the fuel tube directly inserted into the isolation tube 220. Some embodiments may involve creating similar holes 452 in the fuel tube to facilitate attachment. One embodiment of a fuel tube with holes located at one end is shown in FIG. 4B. In FIG. 4B, the fuel tube 240 is shown with a series of holes 472a-472c in a side wall 475 of the body. The holes 472a-472c in the fuel tube 240 are used in conjunction with thermo-welding the isolation tube 230 with the fuel tube 240. This process may be avoided by using an extension tube which can be swaged or otherwise affixed to the fuel tube.

The above embodiments use grooves formed into the isolation tube to receive the ferrule, extension tube, or fuel tube. In another embodiment, the isolation tube does not have grooves, but instead slips over, or within, the other components. One such embodiment is shown in FIG. 5A.

Turning to FIG. 5A, in this embodiment, the ferrule 510 comprises the same profile shape as describe before, but there are no holes 410 present in the side walls of the ferrule. Thus, the ferrule has a cylindrical shape with solid walls. The isolation tube 520 is also a cylindrical shape with solid walls. The fuel tube comprises a bell portion 541 which is demarcated from the remaining portion of the fuel tube 540 by the shoulder 542.

In this embodiment, the ferrule may be joined to the isolation tube 520 by an adhesive, thermo-welding, or spin welding, as may be the isolation tube 520 to the fuel tube 540. The isolation tube 520 may be made from proportionate amounts of carbon, glass, or Kevlar™ reinforced fibers or other material. The adhesive can be an epoxy, resin-based, or other suitable type. The separation spacing 250 in this type of construction may allow a farther spacing and may be amendable to larger diameter components. The isolation tube 520 can be aided in positioning within the fuel tube by the existence of the shoulder 532. This ensures that the isolation tube is not inserted too far within the fuel tube. In one embodiment, the isolation tube 520 is inserted a distance into the fuel tube 540 that is sufficient to provide sufficient rigidity and strength. The ferrule 210 may be slipped over the isolation tube 520 a similar or different distance to provide sufficient rigidity and strength. These distances may be expressed as ratios of the diameter of the ferrule and isolation tube (e.g. 75%). However, other embodiments may use different distances or ratios.

Figure 5B:
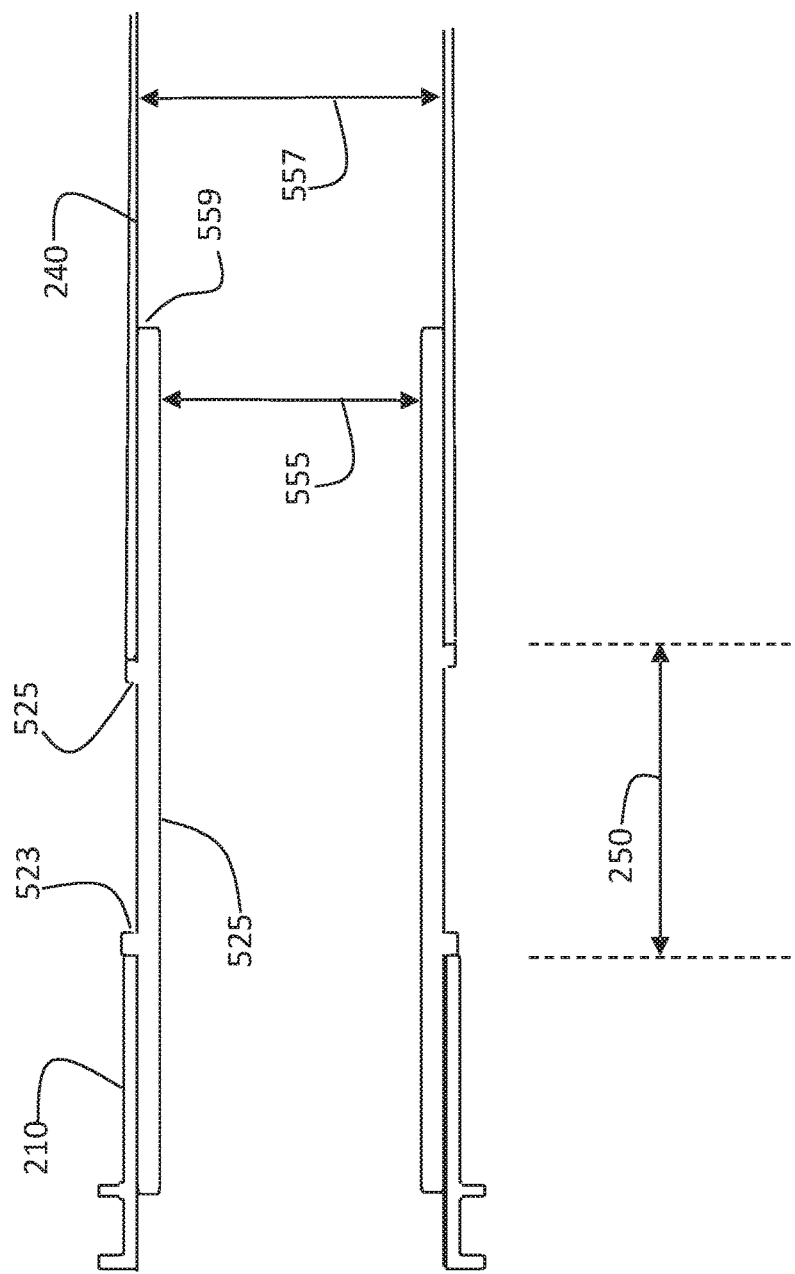

In another embodiment shown in FIG. 5B, stop collars 523 and 525 may be formed on the surface of the isolation tube 525. Again, adhesives, thermo-welding, or spin welding may be used to affix the isolation tube 525 to the ferrule 210, as well as the isolation tube 525 to the fuel tube 240. The use of collar stops 523, 525 ensures that the isolation tube 525 is not inserted too far within the fuel tube 230, and that the ferrule 210 is positioned properly over the isolation tube 230. In some embodiments, the width of the stop collar may be configured differently for strength. In other embodiments the stop collar may bridge the full gap between ferrule and tube. The height of the stop collar may be configured to eliminate the possibility of slipover in service. This embodiment does not require the fuel tube 240 to have the bell shaped end formed prior to assembly.

In FIG. 5B, the diameter of the isolation tube 555 is less than that of the fuel tube 557, so that there may be turbulence in the fluid flow caused by shoulder 559 at the point of junction. In another embodiment, shown in FIG. 6, the fuel tube 240 also does not have a bell shaped end. In this embodiment, the isolation tube is inserted over the fuel tube 240, and the formation of a bell on the isolation tube 620 ensures the proper depth. The separation distance 250 may be determined by the spacing between the ferrule 210 and the fuel tube 240. A collar stop (not shown in FIG. 6) may be also employed to ensure the proper positioning of the ferrule over the isolation tube 620. Again, in this embodiment, adhesive may be used to affix the components together.

In each of the above embodiments, the isolation tube 620 is made from a non-conductive material that provides in-line isolation between the fuel tube and the other component to which the fuel tube is connected to. The isolation tube 620 provides a distance of electrical separation so as to thwart surface flashover. A degree of electrostatic discharge relaxation may be provided by using a conductive additive to the dielectric material, and to the adhesive, if one is used. The additive can be based on carbon, silver, nickel, carbon black, or other particles. According to one embodiment, a resistance range along the isolation tube may be 100 k Ohms to 100 M Ohms @ 5000V for a 3 inch isolating distance. Other embodiments may have a range from 8 k Ohm to 10 M Ohms @ 400V for a 0.2 inch isolating distance. Both embodiments assume usage at an altitude of 40,000 ft.

Figure 7:
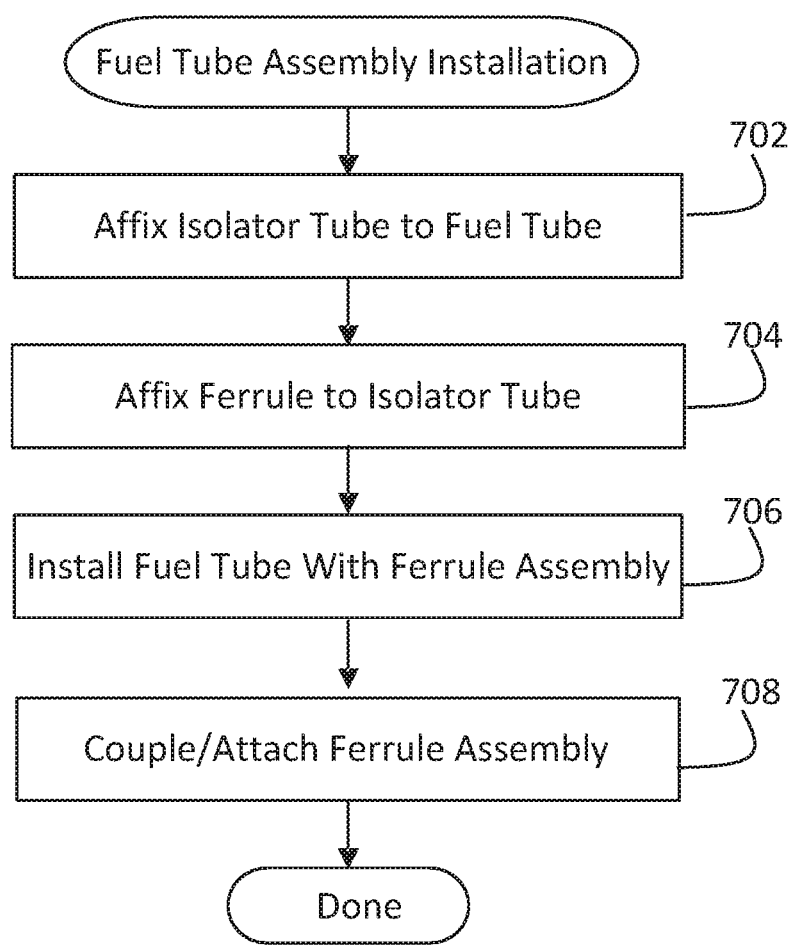
FIG. 7 illustrates a process flow for installing the fuel tube connector assembly according to one embodiment disclosed herein.

A method for using the above identified components is shown in FIG. 7, which discloses a process for installing a fuel tube assembly. The process in FIG. 7 begins with operation 702 of affixing the isolation tube 220 to the fuel tube 240. In this embodiment, it is assumed that an extension tube is not utilized. If an extension tube 230 is utilized, then the extension tube 230 may be first affixed to the fuel tube 240. The isolation tube 220 may be affixed to the fuel tube 240 using adhesives, swaging, or thermo-welding depending on the embodiment used.

In operation 704, the ferrule 210 is affixed to the isolation tube 220. The ferrule 210 may be may be affixed to the isolation tube 220 using adhesives, swaging, or thermo-welding depending on the embodiment used.

Once the components are attached in operation 706, the fuel tube with the ferrule assembly 200 can be inserted into the wing structure, or other structure as may be the case. Typically, ferrule assembly 200 is then affixed to a coupler for coupling with another section of fuel tube 240, or attached to a connection on a fuel system component, such as a pump, valve control, etc.

The operations described in FIG. 7 can occur in a different order. For example, operation 704 of affixing the ferrule to the isolation tube can occur before the operation 702 of affixing the isolation tube to the fuel tube. Further, the operation 706 of inserting the fuel tube in the wing structure can occur before operation 702. Thus, there are various permutations of the order in which the operations in FIG. 7 can occur.

Those skilled in the art will recognize that the concepts and technology presented herein can be embodied in various ways. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A method of installing fuel lines in an aircraft comprising the operations of:

affixing an isolation tube at a first end to a first fuel tube directly or via an extension tube in a manner that prevents relative movement between the isolation tube and the first fuel tube;

affixing a ferrule to a second end of the isolation tube in a manner that prevents relative movement between the isolation tube and the ferrule, wherein the second end of the isolation tube comprises a second end inner band and a second end outer band defining a second end groove, and wherein affixing the ferrule to the second end of the isolation tube comprises inserting a portion of the ferrule into the second end groove;

installing the first fuel tube in a structure of the aircraft; and affixing the ferrule to a fuel system component, wherein any of the first three operations can be performed in any order.

2. The method of claim 1, wherein affixing the ferrule to the fuel system component comprises affixing the ferrule to a coupler.

3. The method of claim 2, wherein affixing the ferrule to the isolation tube comprises either:

thermo-welding or spin welding the ferrule to the isolation tube, or using an adhesive to affix the ferrule to the isolation tube.

4. The method of claim 1, wherein the first end of the isolation tube comprises a first end inner band and a first end outer band defining a first end groove, and wherein affixing the first end of the isolation tube to the first fuel tube comprises inserting a portion of the first fuel tube into the first end groove.

5. A method of installing fuel lines in an aircraft comprising the operations of:

affixing an isolation tube at a first end to a first fuel tube directly or via an extension tube in a manner that prevents relative movement between the isolation tube and the first fuel tube, wherein the first end of the isolation tube comprises a first end inner band and a first end outer band defining a first end groove, and wherein affixing the first end of the isolation tube to the first fuel tube comprises inserting a portion of the first fuel tube into the first end groove;

affixing a ferrule to a second end of the isolation tube in a manner that prevents relative movement between the isolation tube and the ferrule;

installing the first fuel tube in a structure of the aircraft; and affixing the ferrule to a fuel system component, wherein any of the first three operations can be performed in any order.

6. The method of claim 5, wherein affixing the ferrule to the fuel system component comprises affixing the ferrule to a coupler.

7. The method of claim 6, wherein affixing the ferrule to the isolation tube comprises either:

thermo-welding or spin welding the ferrule to the isolation tube, or using an adhesive to affix the ferrule to the isolation tube.

* * * * *